(12) United States Patent
Frederick et al.

(10) Patent No.: US 6,181,299 B1
(45) Date of Patent: *Jan. 30, 2001

(54) POWER AND COMMUNICATION SYSTEM FOR ELECTRONIC DISPLAY TAGS

(75) Inventors: W. Richard Frederick, Mundelein; Kenneth W. Kayser, St. Charles, both of IL (US)

(73) Assignee: Display Edge Technology, Ltd., Troy, OH (US)

( * ) Notice: Under 35 U.S.C. 154(b), the term of this patent shall be extended for 0 days.

This patent is subject to a terminal disclaimer.

(21) Appl. No.: 08/944,308

(22) Filed: Oct. 6, 1997

Related U.S. Application Data

(63) Continuation of application No. 08/309,934, filed on Sep. 21, 1994, now abandoned, which is a continuation-in-part of application No. 08/116,468, filed on Sep. 3, 1993, now Pat. No. 5,537,126.

(51) Int. Cl.[7] .................................................. G09G 5/00

(52) U.S. Cl. ................................................................ 345/1

(58) Field of Search ..................... 345/1, 2, 87; 364/400, 364/401, 425; 340/825.35, 825.47, 825.49; 40/462, 455, 488, 452, 477, 541, 542; 174/72 A, 135; 248/68.1

(56) References Cited

U.S. PATENT DOCUMENTS

| | | |
|---|---|---|
| 3,086,308 | 4/1963 | Ternouth . |
| 3,256,512 | 6/1966 | Pickett et al. . |
| 3,622,992 | 11/1971 | Schoenwitz . |
| 3,742,119 * | 6/1973 | Newman .............................. 174/72 A |
| 4,002,886 | 1/1977 | Sundelin . |
| 4,139,149 | 2/1979 | Crepeau et al. ...................... 235/383 |
| 4,500,880 | 2/1985 | Gomersall et al. . |
| 4,521,677 | 6/1985 | Sarwin . |
| 4,525,713 | 6/1985 | Barletta et al. . |
| 4,603,495 | 8/1986 | Stevens . |
| 4,654,514 | 3/1987 | Watson et al. . |

(List continued on next page.)

FOREIGN PATENT DOCUMENTS

| | | |
|---|---|---|
| 4206793 A1 | 9/1993 | (DE) . |
| 4237467 A1 | 5/1994 | (DE) . |
| 006691 | 6/1979 | (EP) .............................. G01S/13/80 |
| 0 463 341 A1 | 6/1990 | (EP) . |
| 0423188 B1 | 4/1991 | (EP) . |
| 0 497 533 | 8/1992 | (EP) . |
| 0604382 A2 | 6/1994 | (EP) . |
| 0683478 A2 | 11/1995 | (EP) . |
| 2 202 414 | 9/1988 | (GB) . |
| 2240416 | 7/1991 | (GB) . |
| 2 249 854 | 5/1992 | (GB) . |
| 2257278 | 1/1993 | (GB) . |
| 2266401 | 10/1993 | (GB) . |

(List continued on next page.)

OTHER PUBLICATIONS

RD34494—Electronic Price Tag, Research Disclosure (Dec. 1992) p. 969.

*Primary Examiner*—Chanh Nguyen
(74) *Attorney, Agent, or Firm*—Thompson Hine & Flory LLP

(57) ABSTRACT

A power and communication system is provided for a product information display system associated with a product display or storage establishment having multiple product display or storage areas. A plurality of electronic display tags are mounted adjacent the product display or storage areas. An electrical power system supplies a/c. power to the display tags. A main power distribution loop is connected to the power supply and is magnetically coupled to multiple branch power distribution loops which extend along selected groups of display tags for supplying power to those display tags.

5 Claims, 16 Drawing Sheets

U.S. PATENT DOCUMENTS

| | | |
|---|---|---|
| 4,702,558 | 10/1987 | Coles et al. . |
| 4,745,404 | 5/1988 | Kallenberg . |
| 4,766,295 | 8/1988 | Davis et al. ............... 235/383 |
| 4,791,739 | 12/1988 | Hetzer ............................ 40/5 |
| 4,796,028 | 1/1989 | Mackenthun et al. ........ 340/825 |
| 4,821,291 | 4/1989 | Stevens et al. . |
| 4,833,337 | 5/1989 | Kelley et al. .................. 307/11 |
| 4,833,338 | 5/1989 | Bartlett et al. ................ 307/17 |
| 4,864,633 | 9/1989 | Chatelot ........................ 455/41 |
| 4,879,756 | 11/1989 | Stevens et al. ................ 455/39 |
| 4,937,586 | 6/1990 | Stevens et al. . |
| 4,941,201 | 7/1990 | Davis ............................. 455/41 |
| 4,955,000 | 9/1990 | Nastrom ....................... 367/117 |
| 4,962,466 | 10/1990 | Revesz et al. . |
| 5,019,811 | 5/1991 | Olsson et al. . |
| 5,054,112 | 10/1991 | Ike ................................. 455/41 |
| 5,111,196 | 5/1992 | Hunt . |
| 5,160,920 | 11/1992 | Harris ........................... 340/765 |
| 5,172,314 | 12/1992 | Poland et al. . |
| 5,198,644 | 3/1993 | Pfeiffer et al. . |
| 5,241,467 | 8/1993 | Failing et al. . |
| 5,241,657 | 8/1993 | Fine et al. .................... 395/162 |
| 5,245,534 * | 9/1993 | Waterhouse et al. ......... 364/404 |
| 5,260,701 | 11/1993 | Guern et al. ............. 340/825.54 |
| 5,293,400 | 3/1994 | Monod et al. .................. 375/7 |
| 5,345,231 | 9/1994 | Koo et al. ..................... 340/870 |
| 5,348,485 | 9/1994 | Briechle et al. ............... 439/110 |
| 5,374,815 | 12/1994 | Waterhouse et al. .......... 235/383 |
| 5,404,149 | 4/1995 | Joliey ............................. 345/1 |
| 5,448,226 | 9/1995 | Failing, Jr. et al. ........ 340/825.35 |
| 5,461,561 | 10/1995 | Ackerman et al. ............ 364/401 |
| 5,465,085 | 11/1995 | Caldwell et al. .............. 340/825 |
| 5,473,832 | 12/1995 | Briechle et al. ............... 40/642 |
| 5,521,590 | 5/1996 | Hanaoka et al. ........ 340/825.54 |
| 5,532,465 | 7/1996 | Waterhouse et al. ........ 235/383 |
| 5,535,969 * | 7/1996 | Duffy, Jr. .................... 248/68.1 |
| 5,537,126 * | 7/1996 | Kayser et al. ................. 345/2 |
| 5,539,393 | 7/1996 | Barfod ......................... 340/825 |
| 5,548,282 * | 8/1996 | Escritt et al. ........... 340/825.35 |
| 5,553,412 | 9/1996 | Briechle et al. .............. 40/642 |
| 5,557,085 | 9/1996 | Tyren et al. ................. 234/380 |
| 5,559,507 | 9/1996 | Beigel .......................... 340/825 |
| 5,560,970 | 10/1996 | Ludebühl ..................... 428/41.9 |
| 5,572,653 | 11/1996 | DeTemple et al. .......... 395/501 |
| 5,583,487 | 12/1996 | Ackerman et al. ...... 340/825.35 |
| 5,632,010 | 5/1997 | Briechle et al. ................ 345/1 |

FOREIGN PATENT DOCUMENTS

| | | | |
|---|---|---|---|
| 2-287591 | 11/1990 | (JP) . | |
| 4-303294 | 10/1992 | (JP) . | |
| WO 93/11509 | 6/1993 | (JP) ................... G06K/19/00 |
| 9103048 | 4/1993 | (SE) ................... G06F/15/21 |
| WO88/06773 | 9/1988 | (WO) . | |
| WO90/14630 | 11/1990 | (WO) . | |
| WO 91/08539 | 6/1991 | (WO) . | |
| WO 91 11063 | 7/1991 | (WO) . | |
| WO 92/08213 | 5/1992 | (WO) ................... G07G/1/00 |
| WO92/09054 | 5/1992 | (WO) . | |
| WO 93/05456 | 3/1993 | (WO) . | |
| WO 94/00895 | 1/1994 | (WO) . | |
| WO 94/11833 | 5/1994 | (WO) . | |
| WO 94/11834 | 5/1994 | (WO) . | |
| WO 94/11835 | 5/1994 | (WO) . | |
| WO 94/17615 | 8/1994 | (WO) . | |
| 2275807 | 9/1994 | (WO) . | |
| 8900714 | 8/1989 | (ZA) . | |

* cited by examiner

POWER AND COMMUNICATION SYSTEM FOR ELECTRONIC DISPLAY TAGS

CROSS-REFERENCE TO RELATED APPLICATION

This application is a continuation-in-part of U.S. patent application Ser. No. 08/116,468 filed Sep. 3, 1993 now U.S. Pat. No. 5,537,126.

This applicatin is a continuation of application Ser. No. 08/309,934 filed Sep. 21, 1994 now abandoned.

1. Field of the Invention

This invention relates generally to electronic display tag systems for use in product display or storage establishments and, more particularly, to a power and control signal distribution arrangement for such display tag systems.

2. Background of the Invention

Both wired and wireless electronic shelf tag systems have been proposed heretofore, as in U.S. Pat. Nos. 5,198,644; 5,172,314; 5,111,196; 5,019,811; 4,937,586; 4,821,291; 4,603,495; 4,525,713; 4,521,677; and 4,500,880. The wired systems have the advantage of not requiring batteries or photovoltaic power sources in the tags. A disadvantage of the wired systems, however, is the need to install thousands of feet of wire. A typical grocery store may use 20,000 tags, and a wired tag system typically uses an average of three feet of wire per tag. Thus a total of 60,000 feet of wire may be required in a single store.

In addition to the installation problem, wired systems require numerous connections between the wires and the display tags, between the wires on the shelves and wires on the gondolas on which the shelves are usually mounted, and between the wires on adjacent gondolas. These numerous connections complicate the re-location of gondolas, or the re-location of shelves within a gondola. In addition, the contacts used to make the connections must either be made of expensive corrosion-resistant material, such as gold-plated contacts, or else replaced from time to time as corrosion occurs.

Another problem with wired display tag systems is electrostatic discharge, which can occur if a shopper gets too close to an inadequately protected wire or connector contact. Such discharges can damage the expensive electronic equipment included in the tag system, and can cause even greater losses by shutting down the display system.

SUMMARY OF THE INVENTION

It is a primary object of the present invention to provide an improved electronic display tag wiring system which avoids the need for electrical contacts in the numerous connections among the various components of the system. A related object is to provide an improved electronic display tag system which does not require batteries or photovoltaic sources in the tags.

It is another important object of this invention to provide such an improved electronic display tag wiring system which facilitates the installation of the thousands of feet of wire required in such a system. In this connection, a related object of the invention is to provide such an improved system which also facilitates relocation of gondolas or of the shelves within a gondola.

A further object of this invention is to provide an improved electronic display tag wiring system which significantly reduces the cost of installing and maintaining the system.

Yet another object of this invention is to provide such an improved electronic display tag wiring system which virtually eliminates any risk of losses due to electrostatic discharges.

A still further object of this invention is to provide an improved electronic display tag wiring system which greatly reduces the need for periodic replacement of corroded parts.

In accordance with the present invention, the foregoing objectives are realized by providing a power and communication system for electronic display tags which includes a plurality of such tags mounted adjacent to the multiple product display or storage areas, an electrical power supply for supplying a-c. power to the display tags, a source of control signals for the display tags, multiple branch distribution loops each of which extends along a selected group of the display tags for supplying power and control signals to the display tags, and a main distribution loop connected to the power supply and control signal source and magnetically coupled to the branch loops for supplying power and control signals to the branch loops.

In a preferred embodiment of the invention, the branch distribution loops, at least portions of the main distribution loop, and magnetic cores for forming the magnetic couplings are all prefabricated as modular units which can be easily and quickly installed and assembled on site in the product display or storage establishment, and which can also be easily disconnected and re-connected whenever it is desired to rearrange any portion of the display or storage system.

DETAILED DESCRIPTION OF PREFERRED EMBODIMENTS

Figure 1:
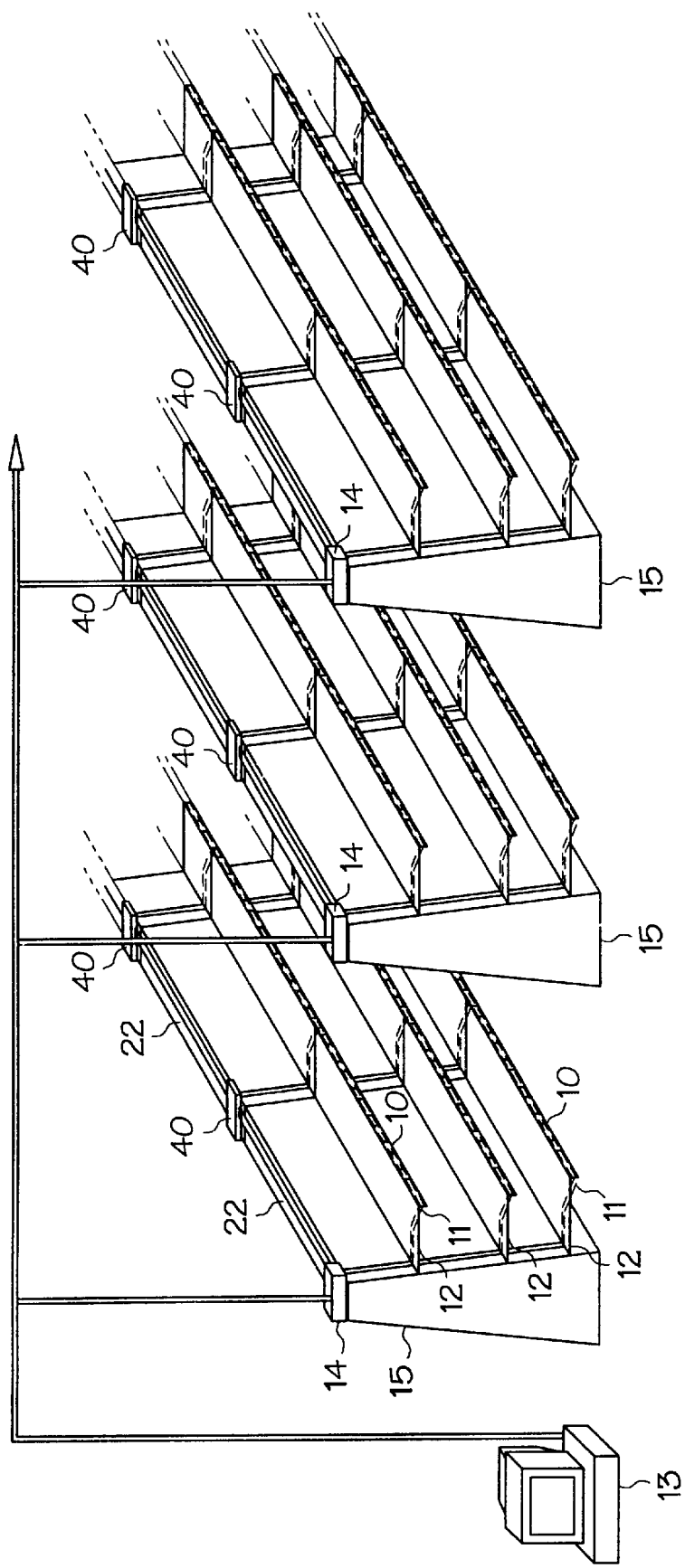
FIG. 1 is a perspective view of a typical layout of part of a retail store equipped with a product information display system embodying the present invention.

While the invention is susceptible to various modifications and alternative forms, specific embodiments thereof have been shown by way of example in the drawings and will herein be described in detail. It should be understood, however, that it is not intended to limit the invention to the particular forms disclosed, but, on the contrary, the intention is to cover all modifications, equivalents and alternatives falling within the spirit and scope of the invention as defined by the appended claims.

Turning now to the drawings, FIG. 1 depicts part of a retail store including a product information display system arranged according to a preferred embodiment of the present invention. The system includes a plurality of display tags 10 disposed along the front rails 11 of the store's multiple display shelves 12. The prices, descriptions and/or special information for all the products are displayed on the front edges of the shelves 12, near the respective products. Typically, there is a one-to-one correspondence between each display tag 10 and a particular item of merchandise. Although certain applications may require a display tag 10 to display product-related information regarding multiple products, e.g., the respective products above and below the display tag 10, preferably each display tag 10 displays information for only one product.

The information to be displayed at each display tag 10 is provided by a system controller 13. The system controller 13 communicates with the display tags 10 through a gondola-mounted area controller 14 which services a large number of display tags 10 in a prescribed area. Each area controller 14 is contained in an enclosed housing which is mounted on one of the gondolas 15 on which the shelves are mounted. The system controller 13 regularly communicates with the display tags 10 for monitoring and reporting display tag failures to the system user and for identifying service inquiries and updating the display information, e.g., with price changes.

Figure 2:
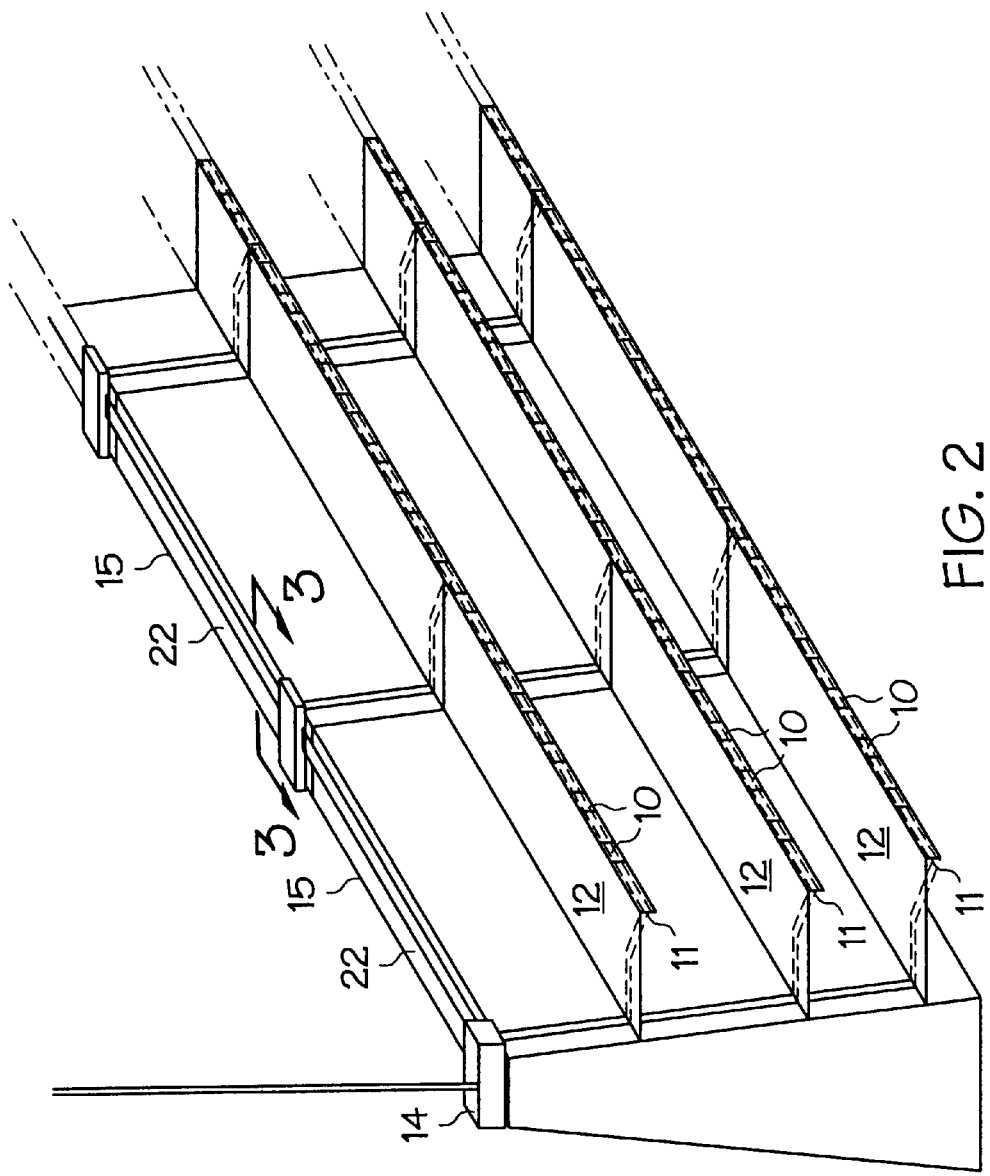
FIG. 2 is an enlarged view of a portion of FIG. 1.
Figure 3:
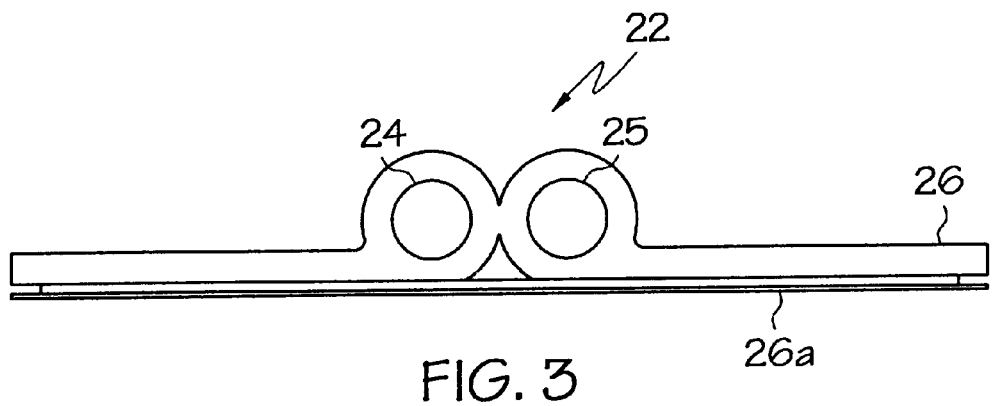
FIG. 3 is an enlarged section taken generally along line 3—3 in FIG. 2.

Each area controller 14 supplies both power and control signals to its display tags via a single main distribution loop and numerous branch distribution loops. The area controller 14 also monitors the display tags and receives signals generated by the tags, such as service requests and acknowledgement signals. A single area controller can usually service at least 1000 display tags. Although the gondolas 15 in FIGS. 1 and 2 are illustrated with only three shelves on each side, a gondola typically has about twelve shelves (six on each side), with an average of about six tags per shelf, or 72 tags per gondola. Thus, a single area controller can service 12 to 15 gondolas.

Figure 4:
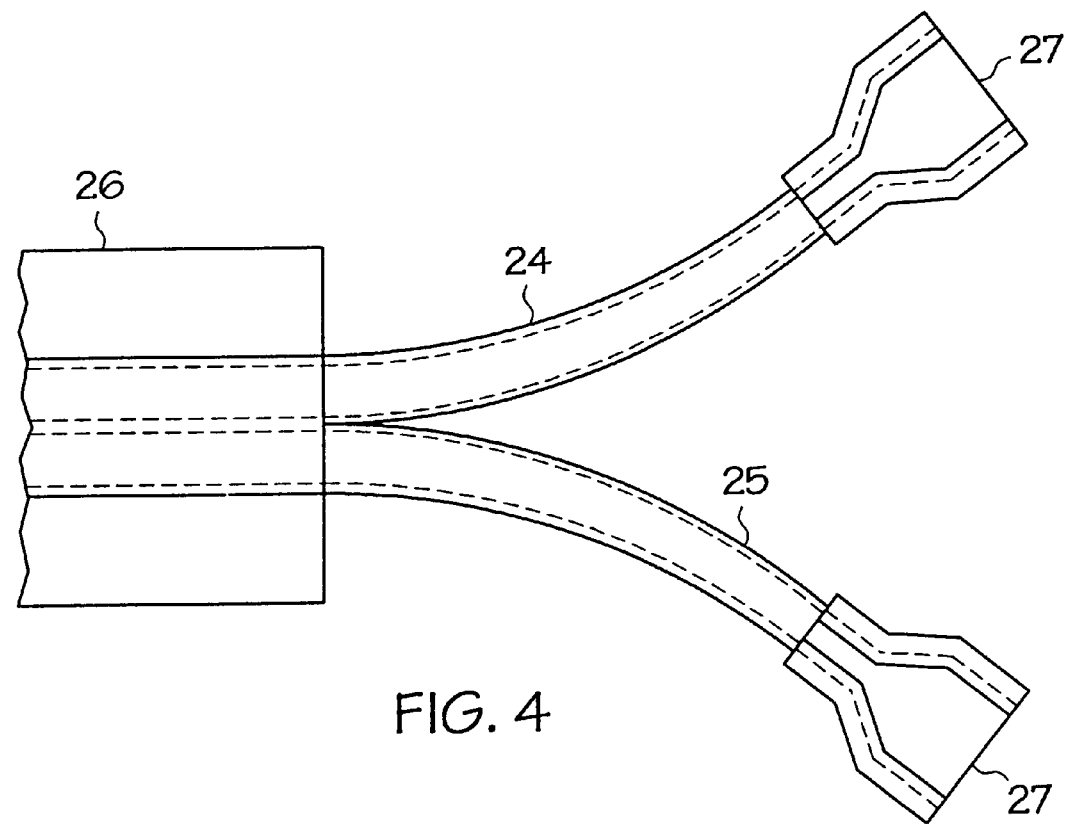
FIG. 4 is an enlarged plan view of the end portion of the module mounted on the top of one of the gondolas illustrated in FIGS. 1 and 2.
Figure 6:
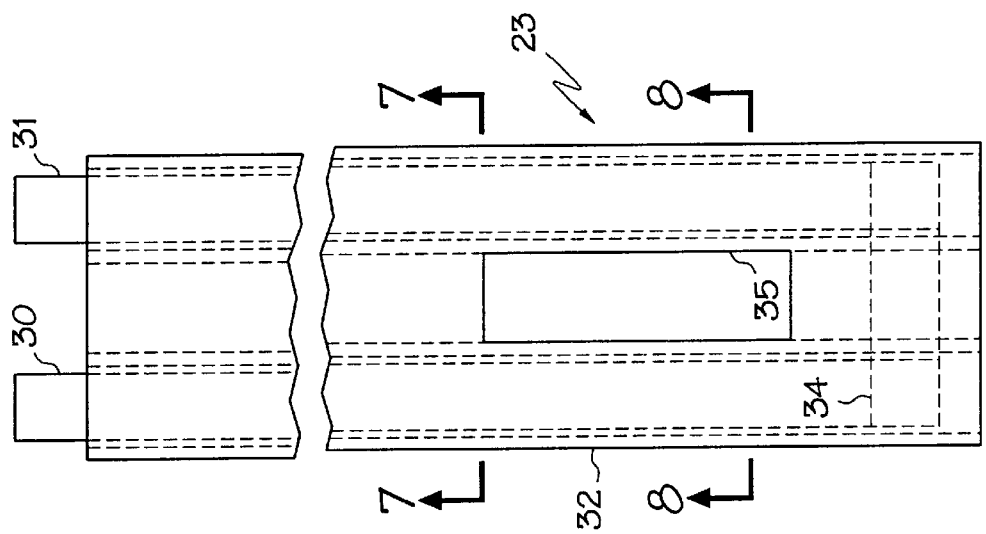
FIG. 6 is an enlarged side elevation of one of the two vertical wiring modules included in each gondola, as illustrated in FIG. 5.
Figure 12:
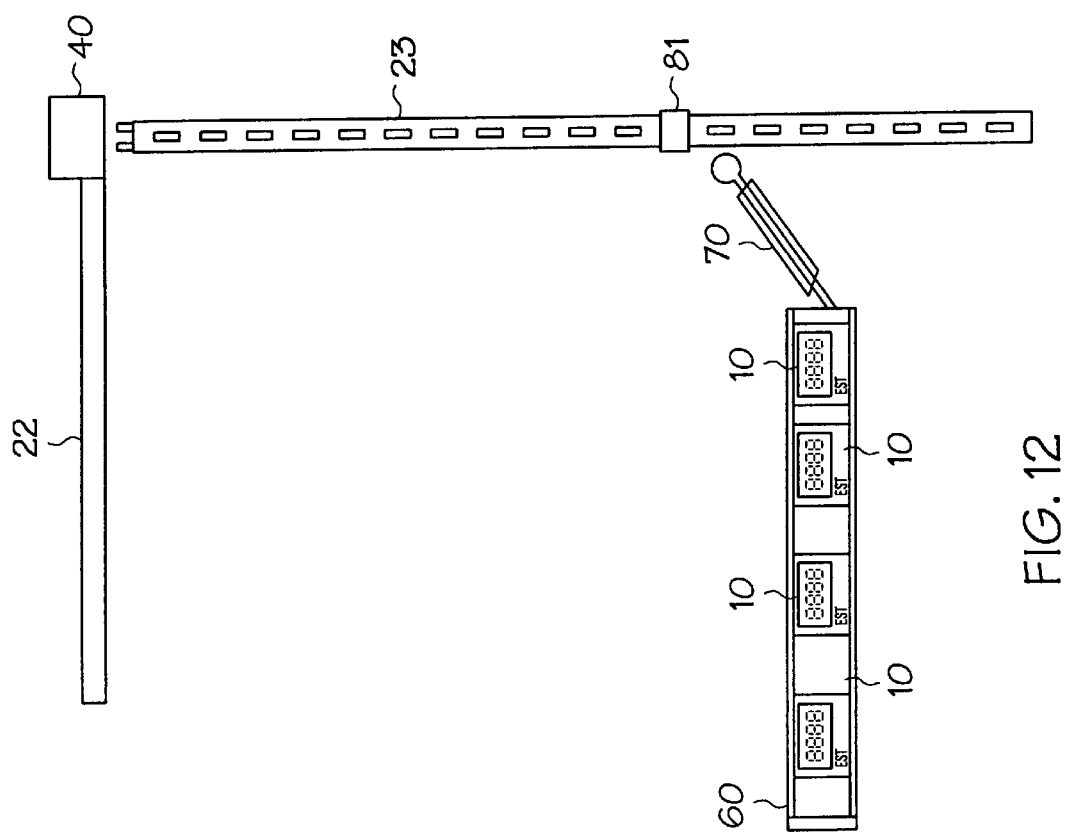
FIG. 12 is a diagrammatic exploded side elevation of the various wiring and coupling modules included in the power and communication system illustrated in FIGS. 1 and 2.

The main distribution loop connected to each area controller 14 is formed by a series arrangement of two standard modules 22 and 23 (see FIG. 12). The first module 22 will be referred to herein as the "transfer module," and is simply a pair of parallel wires 24 and 25 encased in a dielectric strip 26 that can be easily attached to the top of a gondola 15. The dielectric surrounding each wire preferably has a thickness of about 0.015 to 0.020 inch to protect the system from electrostatic discharges. If desired, the flat side of the strip 26 may be coated with an adhesive 26a, protected until installation by a releasable backing, to facilitate application of the strip to the gondola. The dielectric strip 26 containing the two wires 24, 25 can be manufactured in large quantities at a low cost by a conventional extrusion process. The distance between the wires 24, 25 is preferably minimized to reduce inductance. For example, when the wire is 18 AWG multi-strand wire, the center-to-center spacing of the wires may be 0.125 inch. As illustrated in FIG. 4, the mounting strip 26 is removed from a 2 to 3-inch length of both wires at both ends, and a quick connect 27 is crimped onto each exposed wire end.

The second module 23 used to form the main distribution loop will be referred to herein as the "coupling module," and extends vertically along one end of each side of the gondola. Each coupling module 23 is a pair of parallel conductors 30 and 31 joined at the lower end to form a U-shaped segment of the main distribution loop. A single module 23 is used to distribute power and control signals to all the shelves on one side of a gondola. As in the case of the transfer module 22, the conductors 30, 31 in the coupling module 23 are encased in a dielectric strip 32 which covers the outside surface of each conductor 30, 31 with a dielectric thickness of at least 0.015 to 0.020 inch to protect the system from electrostatic discharges.

Figure 5:
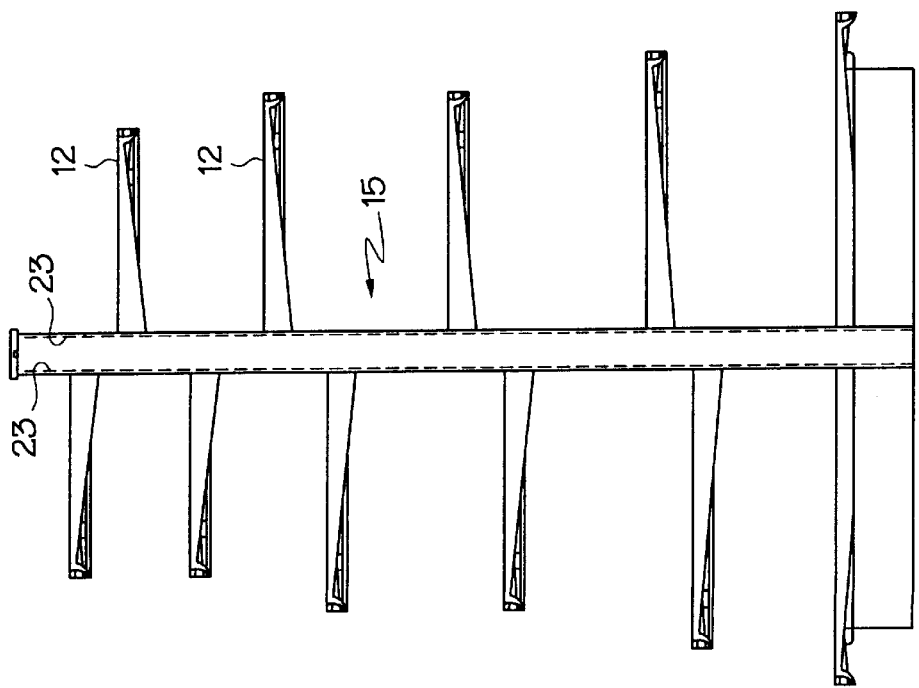
FIG. 5 is an enlarged end elevation of one of the gondolas illustrated in FIGS. 1 and 2.
Figure 7:
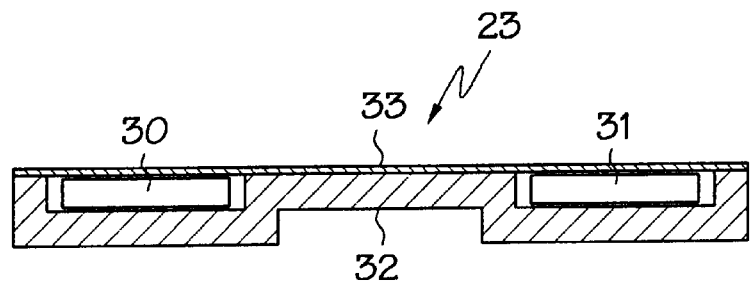
FIG. 7 is a section taken generally along line 7—7 in FIG. 6.
Figure 8:
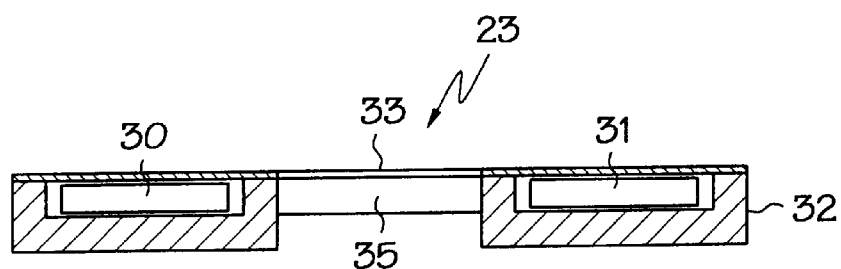
FIG. 8 is a section taken generally along line 8—8 in FIG. 6.

To facilitate installation of the coupling module 23 in the 0.25-inch gap that normally exists behind the shelves on a gondola (see FIG. 5), the conductors 30, 31 are preferably in the form of thin flat strips of copper, e.g., 0.110 inch by 0.018 inch. These strips are contained in channels of a dielectric strip 32 having a total thickness of 0.0446 inch, and are held in place by a thin insulating plastic sheet 33 (FIG. 7) that is thermally bonded to the dielectric strip 32. A conductive cross bar 34 connects the two conductors 30, 31 at the lower end of the strip 32. At the upper end, the two conductors terminate in a configuration that mates with the quick connects 27 on the ends of the transfer module 22, so that the two modules 22 and 23 can be easily and quickly snapped together.

Figure 9A:
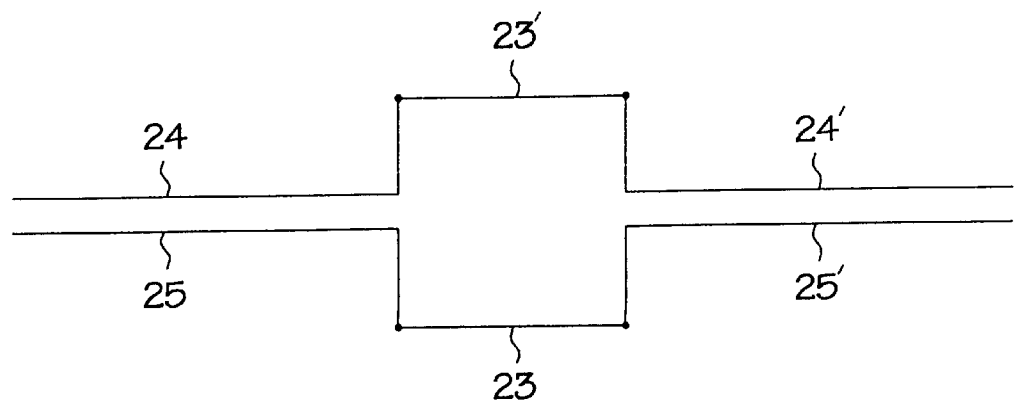
FIG. 9a is a schematic illustration of a portion of the main distribution loop in the system of FIGS. 1–8.
Figure 9:
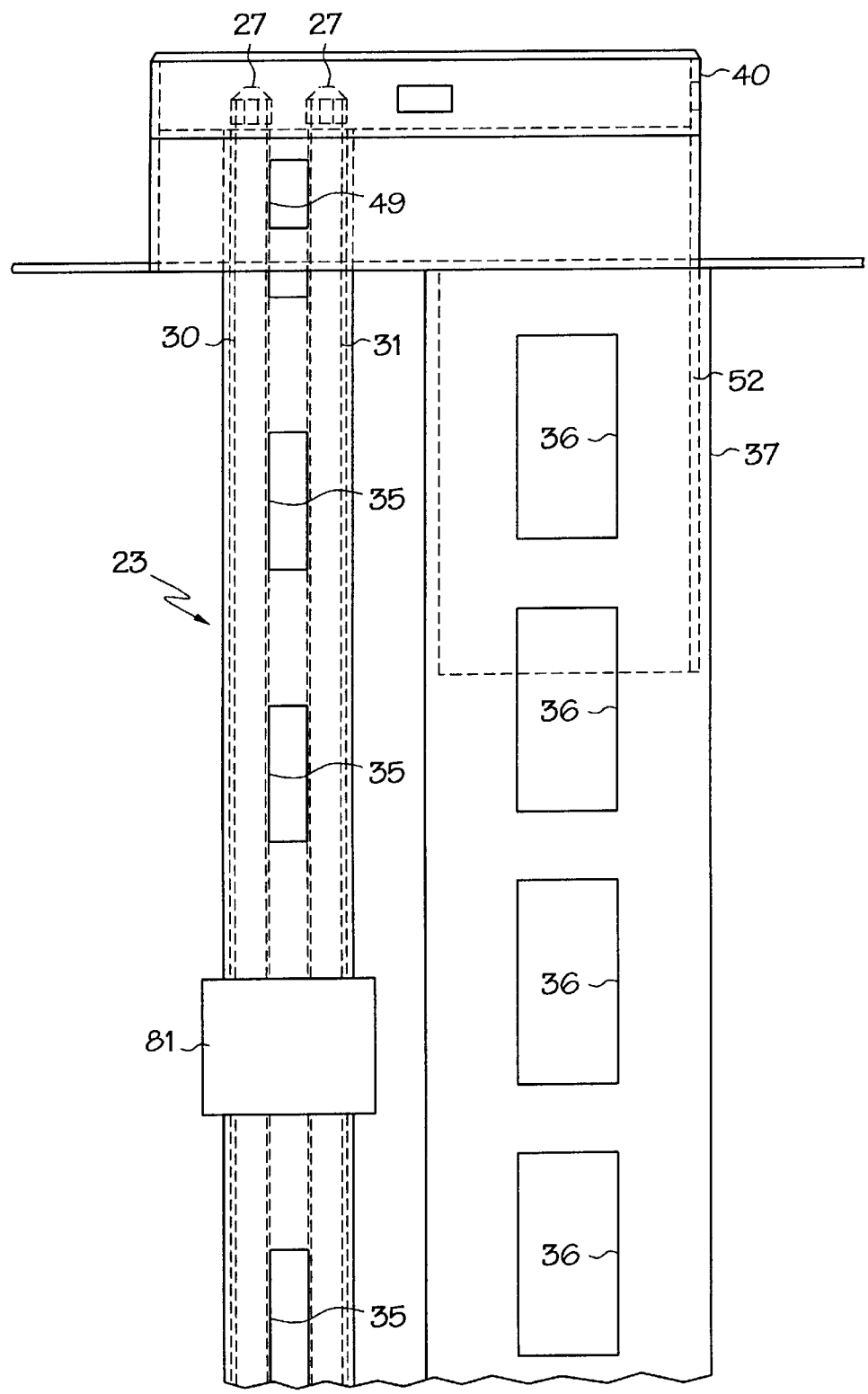
FIG. 9 is a further enlarged end elevation of the top portion of the gondola illustrated in FIG. 5, with the end wall of the gondola broken away to show the internal structure.
Figure 10:
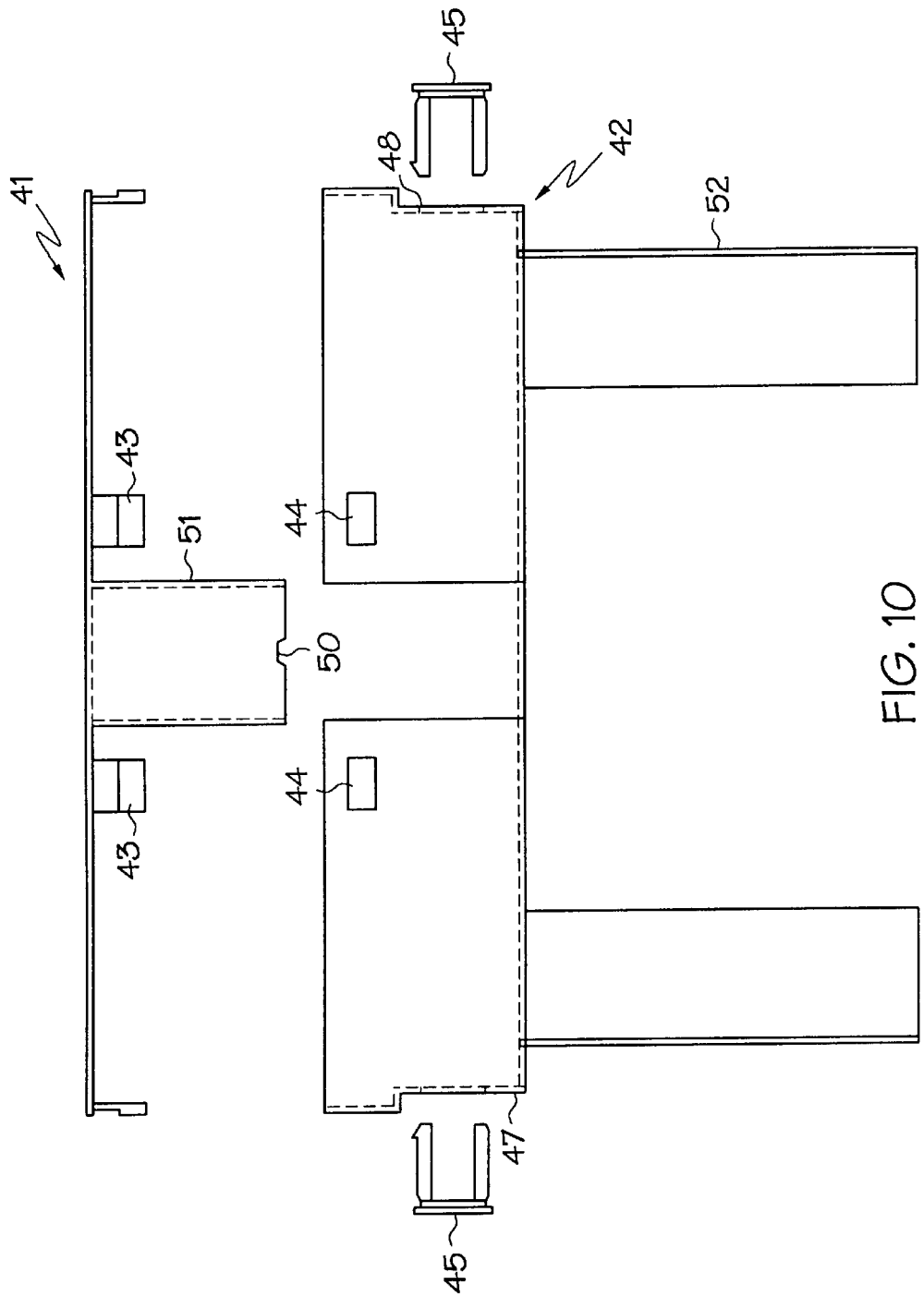
FIG. 10 is an enlarged and exploded view of the junction box mounted on the top of the end portion of the gondola illustrated in FIG. 9.
Figure 11:
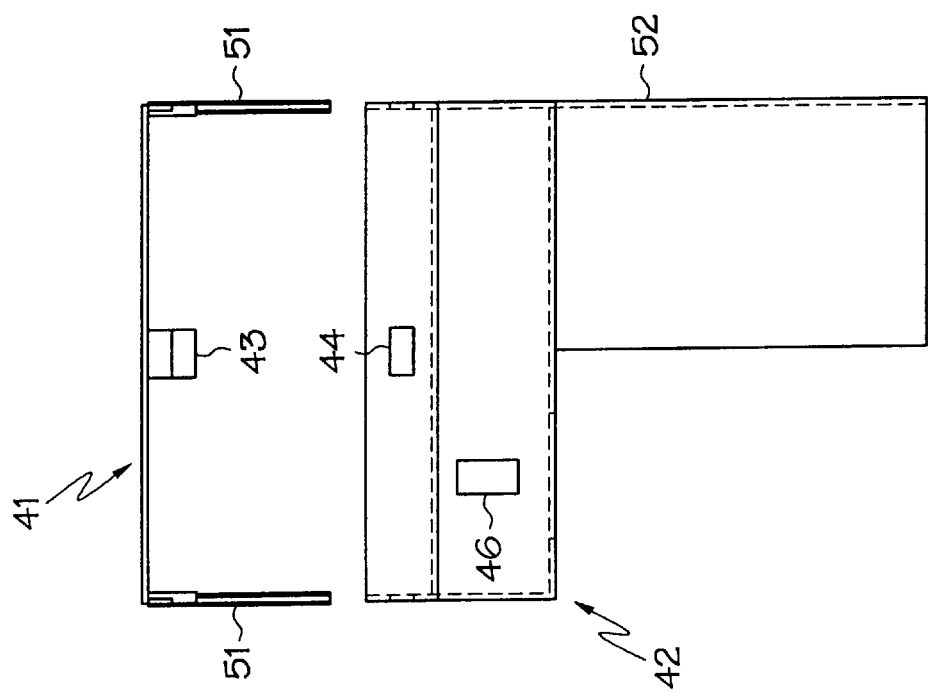
FIG. 11 is a side elevation of the exploded junction box of FIG. 10.

In order to facilitate coupling of the conductors 30 and 31 to the branch distribution loops on the shelf rails, rectangular holes 35 are formed in the central web of the dielectric strip 32, at regular intervals along the length of the strip. As will be described in detail below, these holes 35 are used to receive a snap-on magnetic core module that couples the main and branch distribution loops. The center-to-center spacing of the holes 35 along the length of the strip is preferably the same as that of the shelf-mounting holes 36 in the shelf-support column 37 on the gondola (FIG. 9), so that a hole 35 will always be located close to the rear edge of a shelf, regardless of where the shelf is mounted on the gondola. The coupling modules 23 may be prefabricated in different lengths to match the dimensions of gondolas of varying heights.

To facilitate alignment of the transfer and coupling modules 22 and 23 at the top of each gondola, and to enclose the connections between these two modules, the junction box 40 shown in FIGS. 9–12 is preferably used. This junction box 42 also aligns the holes 35 in the coupling module 23 with the shelf-mounting holes 36 in the gondola. This junction box 40 is formed in two parts 41 and 42, joined by a series of snap locks formed by depending clips 43 on the upper part 41 and mating holes 44 in the lower part 42. The upper ends of the coupling modules 23 are aligned by a pair of plugs 45 which fit through a corresponding pair of holes 46 in a pair of opposed vertical walls 47 and 48 of the junction box. The prongs on the inner ends of the plugs 45 fit into corresponding holes 49 (FIG. 10) near the upper ends of the coupling modules 23, thereby fixing the positions of the upper ends of the coupling modules both horizontally and vertically.

The transfer module 22 on the top of the gondola is registered in a pair of notches 50 formed in the lower ends of a pair of guide legs 51 depending from opposite sides of the upper part 41 of the junction box. This registration ensures that the quick connects 27 on the end of the transfer module 22 will be conveniently located with respect to the upper ends of the conductors 30 and 31 in the coupling module 23.

To position the junction box 40 itself, the lower part 42 has a depending alignment leg 52 which fits into the interior of the shelf-support column 37 of the gondola. The open top of this steel column 37 is normally closed with a plastic cap, which can be simply removed and replaced with the lower part 42 of the junction box. Thus the junction box 40 will always be precisely positioned with respect to the ends of the gondola shelves, whose positions are fixed by the steel column 37.

Figure 13:
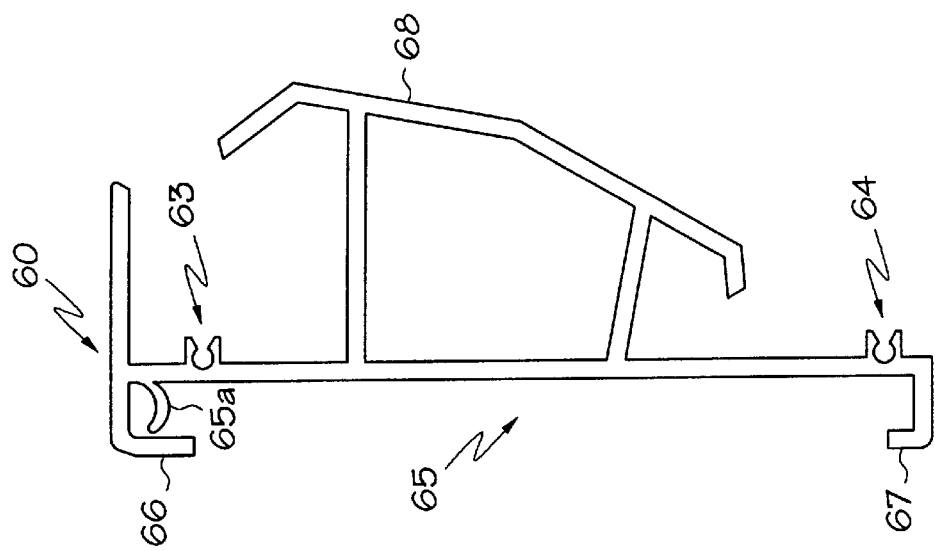
FIG. 13 is an enlarged vertical section through one of the shelf rails in the system of FIGS. 1 and 2.
Figure 14:
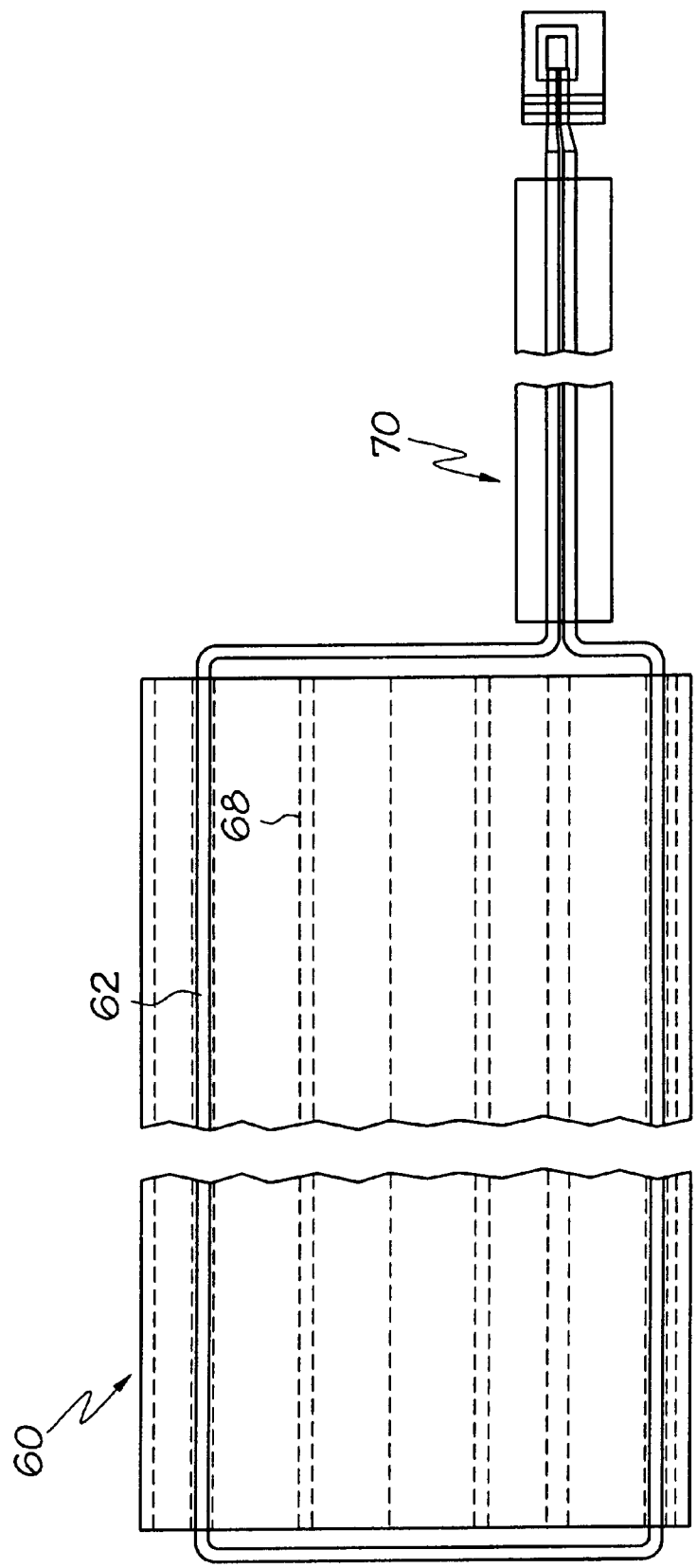
FIG. 14 is a side elevation of the rail of FIG. 13 with the wiring installed thereon.
Figure 18:
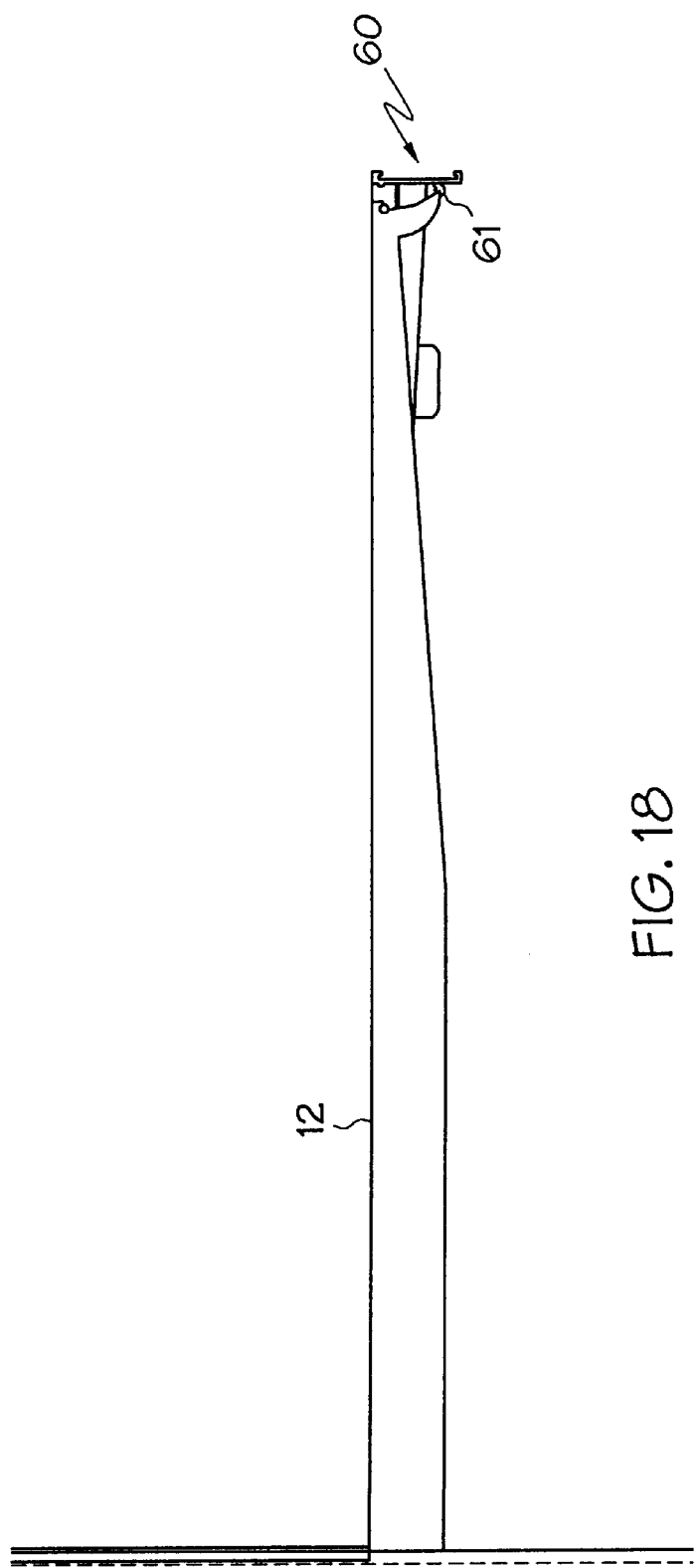
FIG. 18 is an enlarged end elevation of one of the shelves in the system of FIG. 1.
Figure 19:
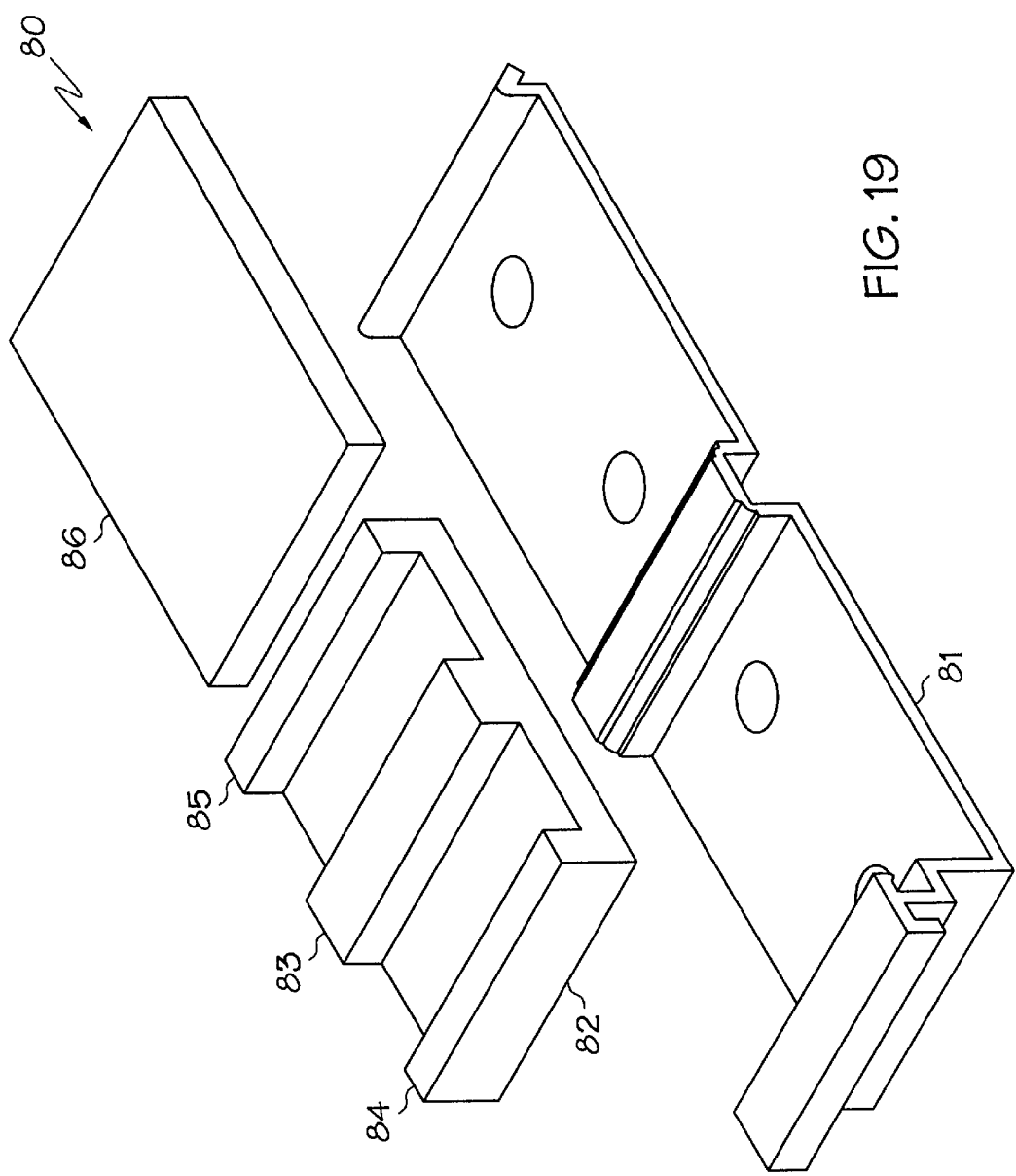
FIG. 19 is an exploded perspective view of one of the magnetic core units used to form the magnetic coupling between the wiring on one of the shelves and one of the vertical wiring modules.
Figure 20:
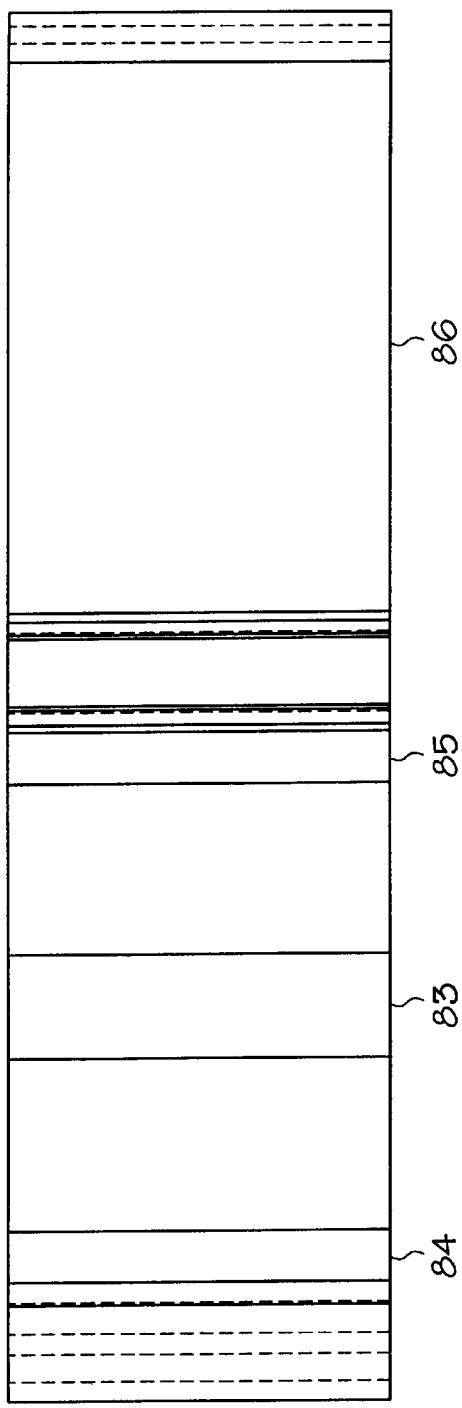
FIG. 20 is a top plan view of the magnetic core module illustrated in FIG. 19.
Figure 21:
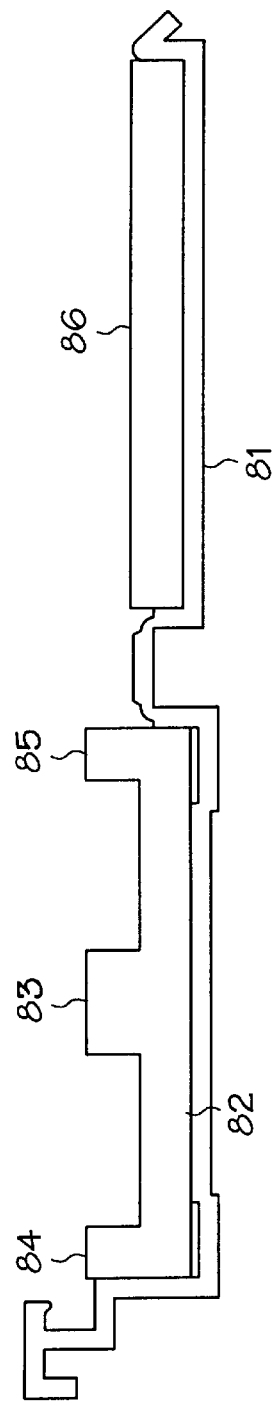
FIG. 21 is a side plan view of the module illustrated in FIG. 20.

Each shelf 12 has its own branch distribution loop, mounted on the rear side of an extruded plastic rail 60 that snaps onto the front of a standard shelf. FIGS. 13 and 14 illustrate a preferred arrangement for mounting the display tags 10 on a conventional shelf 12 which includes a depending rail 61 (FIG. 18) formed as an integral part of the shelf. The auxiliary rail 60 is snapped into the shelf rail 61 and extends continuously along the full length of a shelf 12 for receiving both the display tags 10 and the branch loop.

The auxiliary rail 60 is designed so that the display tags 10 and a conductor 62 that forms the branch loop may be snapped into place on the rail. The insulated conductor 62 is mounted in two channels 63 and 64 formed near the top and bottom of the rear wall of the rail 60. The tags 10 are received in a channel 65 formed in the front side of the rail 60. The tags are recessed inside, and held in place by, a pair of flanges 66 and 67 so that the tags do not protrude from the rail. A curved rib 65a extends across a major portion of the space behind the upper flange 66 so as to form a spring element that can be deflected by pressing a tag upwardly behind the flange 66; the rib 65a then exerts a biasing pressure on the inserted tag to hold it in place on the rail 60. A hollow core 68 on the rear side of the rail 60 snaps into the open recess formed on the front of a standard shelf rail 61 to hold the rail 60 in place on the shelf rail 61.

When a display tag 10 is attached to the rail 60, a pick-up coil on the tag is in close proximity to the two parallel runs of the conductor 62 on the rear side of the rail 60. Thus, the pick-up coil is electromagnetically coupled to both segments of the conductor 62. The conductor 62 is snapped into the top channel 63 of the rail 60, spans the length of the store shelf 12, and then loops to the bottom channel 64 of the rail 60 and spans the length of the shelf rail again. Alternate phasing of vertically adjacent shelves minimizes cross talk between adjacent conductors along the shelves and avoids any significant radiation of signals from the entire system or susceptibility from other sources.

At the rail end adjacent the vertical coupling module 23, the conductor 62 is extended to form a U-shaped segment 70 that can be magnetically coupled to the module 23. As can be seen in FIGS. 14–17, the portion of the U-shaped extension 70 adjacent the end of the rail 60 is simply a side-by-side extension of the two runs of wire 62 mounted on the rail. This portion of the extension 70 is long enough to traverse the underside of the shelf, from the front edge to the rear edge, and may be provided with an adhesive coating on one side to facilitate attachment thereof to the underside of a shelf. At the lower end of the rear edge of the shelf, the two ends of the wire 62 are joined to two legs of a U-shaped flat conductor 71 enclosed in a thin, flat dielectric case 72. This flat conductor 71 is similar to the flat copper conductors 30, 31 in the coupling module 23, and the closed end portion 73 of the encased U-shaped conductor 71 has exactly the same width and thickness as the coupling module 23. It also has a rectangular hole 74, between the legs of the U, of exactly the same dimensions as the holes 35 in the coupling module 23. Accordion folds 75 are preferably formed near the open end of the U to permit the length of the U to be varied slightly to accommodate small variations in the distance between the rear edge of the shelf and the nearest hole 35 in the coupling module 23.

To form a magnetic coupling between the branch and main distribution loops, the flat U-shaped portion 71 of the branch loop extension 70 is placed flat against the coupling module 23 with the rectangular holes 74, 35 in the two flat elements in exact register with each other. A two-piece magnetic core 80 is then clamped against opposite sides of the two flat elements, and fastened together by a hinged dielectric casing 81 attached to the two parts of the core. One part of the magnetic core 80 is an E-shaped piece 82 in which the middle arm 83 of the E is dimensioned to fit into and extend through the registered rectangular holes in the two flat elements 73 and 23. The other two arms 84 and 85 of the E extend along the outside edges of the two flat elements.

Figure 22:
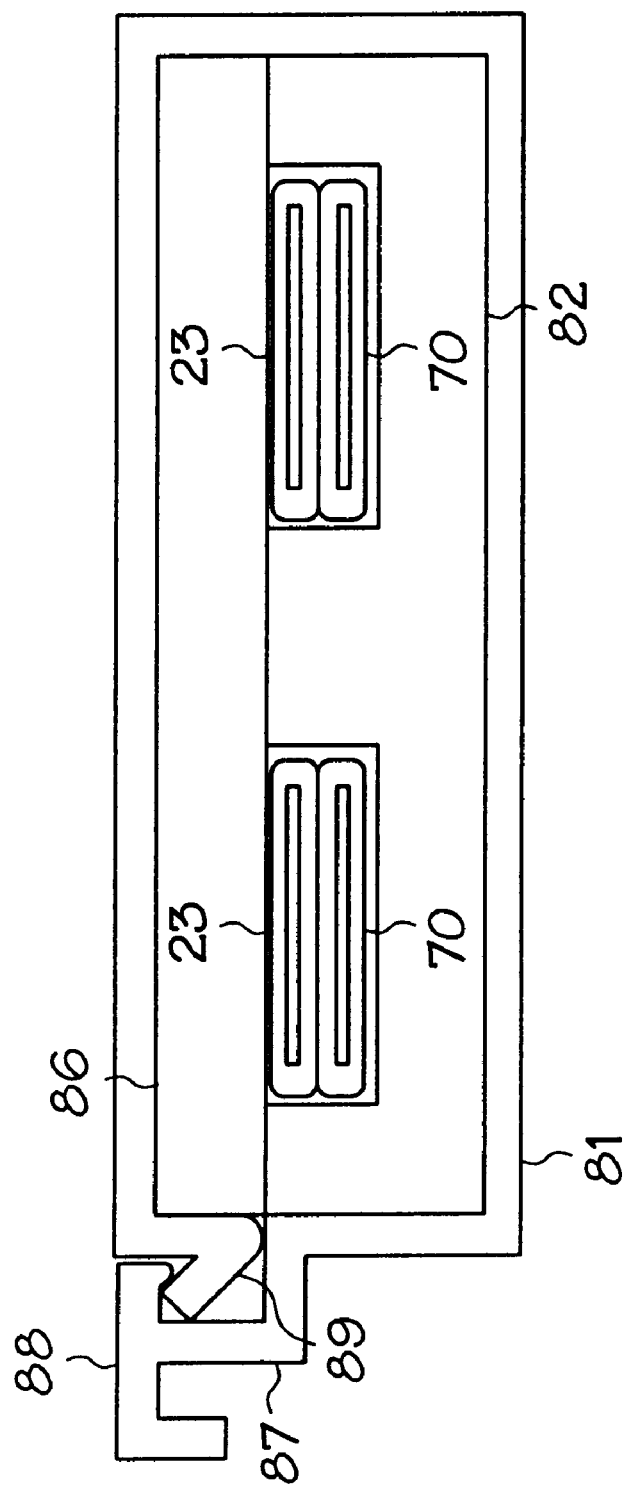
FIG. 22 is an end elevation of the module of FIGS. 20 and 21, after the module has been closed around the two pairs of connectors that complete a magnetic coupling.

The second part of the magnetic core 80 is a straight piece 86 which closes the open side of the E when the two pieces 82 and 86 are brought together. The resulting core completely surrounds the two conductors in both flat elements 73 and 23, as can be seen in FIG. 22, and also fills the common central opening formed by the registered holes 74, 35 between the two pairs of conductors. Thus, current flow in either loop 70 or 23 will induce a corresponding current flow in the other loop through the magnetic coupling. The energy transfer through the magnetic coupling is highly efficient, e.g., as high as 95%.

To hold the two pieces of the magnetic core together, with the two flat elements 73 and 23 sandwiched between the core pieces 82 and 86, the hinged dielectric case 81 for the core pieces includes a latch that snaps closed as the two core pieces are brought into engagement with each other. Specifically, a channel 87 with an inturned lip 88 formed on one free end of the housing flexes outwardly as it is forced past an angled lip 89 on the other free end of the housing. When the edges of the two lips 88 and 89 clear each other, the outer lip 88 snaps into the groove formed by the inner angled lip 89. This snap-action latch enables an installer to quickly and easily assemble the magnetic couplings that join the numerous branch loops to the various coupling modules 23 in the main loop. If the shelves are re-arranged at a later time, the core module can be easily unlatched, re-located, and re-latched. The two core pieces 82 and 86 are preferably pre-attached to their hinged case 81 by adhesive bonding so that the two core pieces and their case can be handled as a single part during assembly and dis-assembly of the magnetic coupling.

The modular construction of this invention permits large display tag systems to be assembled from only a few different types of prefabricated modules. The principal modules are the transfer module and the coupling module that make up the main distribution loop, the rail module that includes a branch distribution loop, and the magnetic core module. The junction box is not part of the electrical system but is another repetitive module that facilitates assembly of the electrical modules. Mass production of this relatively small number of modules reduces the overall cost of the display tag system, and significantly shortens the time required for installation. Moreover, the resulting system is highly reliable and relatively maintenance-free because of the small number of electrical contacts subject to corrosion. The system is also largely immune from damage from electrostatic discharges because all vulnerable portions of the system are enclosed in protective casings. Finally, this system provides virtually unlimited flexibility for the owner to re-locate any desired section of the display or storage facility with only minimal additional work to disconnect and re-connect the display system.

What is claimed is:

1. A power and communication system for a product information display system associated with a product display or storage establishment having multiple product display or storage areas each of which includes a plurality of shelves, comprising
    a plurality of electronic display tags mounted on said shelves in said product display or storage areas,
    an electrical power supply for supplying a-c power to said display tags,
    multiple branch power distribution loops each of which extends horizontally along said display tags on one of said shelves for supplying power to those display tags,
    a main power distribution loop connected to said power supply and including multiple vertical sections each of which extends vertically along said plurality of shelves in one of said product display or storage areas carrying a main electrical signal, each of said vertical sections being magnetically coupled to at least one of said branch loops for supplying power thereto;
    wherein each of said branch loops and the display tags associated therewith are mounted on a common rail with one end of the branch loop extending from one end of the rail in a p redetermined configuration adapted to form part of a magnetic coupling to said main loop; and
    wherein said predetermined configuration of said one end of each branch loop is a first flat dielectric strip encasing the loop, and said main loop includes a section encased in a second flat dielectric strip, said first and second dielectric strips forming mating openings for receiving a magnetic core for magnetically coupling the branch loop to the main loop.

2. The power and communication system of claim 1 wherein each magnetic core comprises a two-part magnetic core and a dielectric case for enclosing said core and attaching the core to said first and second dielectric strips with the core extending through said mating openings.

3. The power and communication system of claim 2 wherein said dielectric case is a hinged case and the two parts of said core are attached to said case on opposite sides of the hinge so that the core can be clamped onto said dielectric strips by closing the case.

4. The power and communication system of claim 1 wherein said multiple product display or storage areas comprise multiple gondolas each containing multiple shelves with at least one of said second dielectric strips extending vertically along the ends of a plurality of said shelves at the rear edges of said shelves, with one of said rails extending horizontally along the front edge of each shelf, and with the extensions of said branch loops extending between the front and rear edges of the shelves for coupling the branch loops on the front edges of the shelves to the main loop segment in the vertical dielectric strip at the rear edges of the shelves.

5. A power and communication system for a product information display system associated with a product display or storage establishment having multiple product display or storage areas each of which includes a plurality of shelves, comprising
    a plurality of electronic display tags mounted on said shelves in said product display or storage areas,
    an electrical power supply for supplying a-c power,
    multiple branch power distribution loops each of which extends horizontally along one of said shelves for carrying a branch electrical signal containing power to a group of display tags, each branch loop formed by an electrical conductor separate from its respective shelf; and
    a main power distribution loop carrying a main electrical signal and connected to said power supply and including multiple vertical sections each of which extends vertically along said plurality of shelves in one of said product display or storage areas, each of said vertical sections being magnetically coupled to at least one of said branch loops for inducing the branch electrical signal therein.

* * * * *

UNITED STATES PATENT AND TRADEMARK OFFICE
CERTIFICATE OF CORRECTION

PATENT NO.    : 6,181,299 B1
DATED         : January 30, 2001
INVENTOR(S)   : W. Richard Frederick et al.

Figures 15, 16:
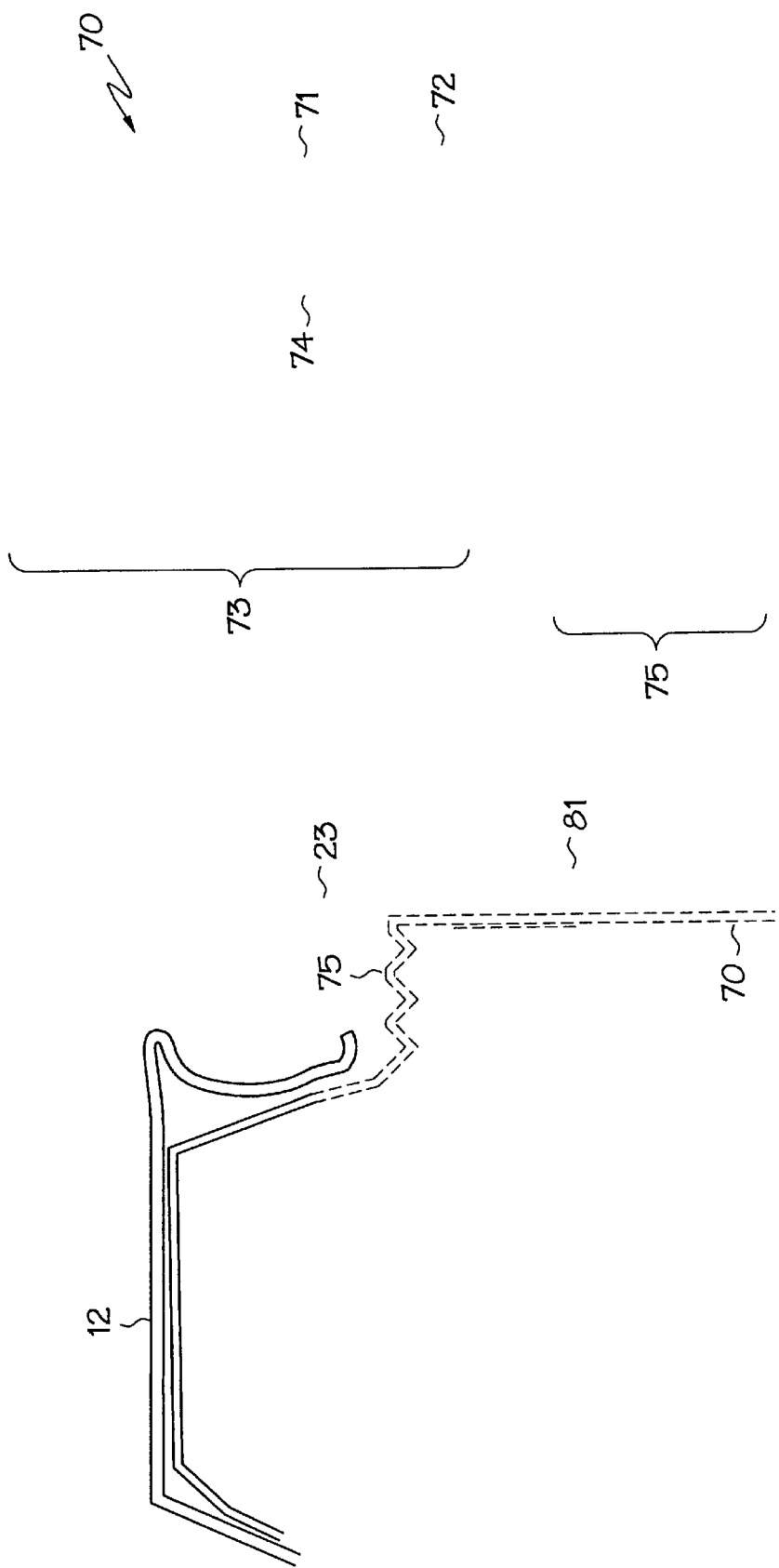
FIG. 15 is a vertical section through one of the shelves in the system of FIGS. 1 and 2, and illustrating the electrical wiring arrangement at the rear of the shelf.
FIG. 16 is an enlarged side elevation of one of the wiring elements illustrated in FIG. 15.
Figure 17:
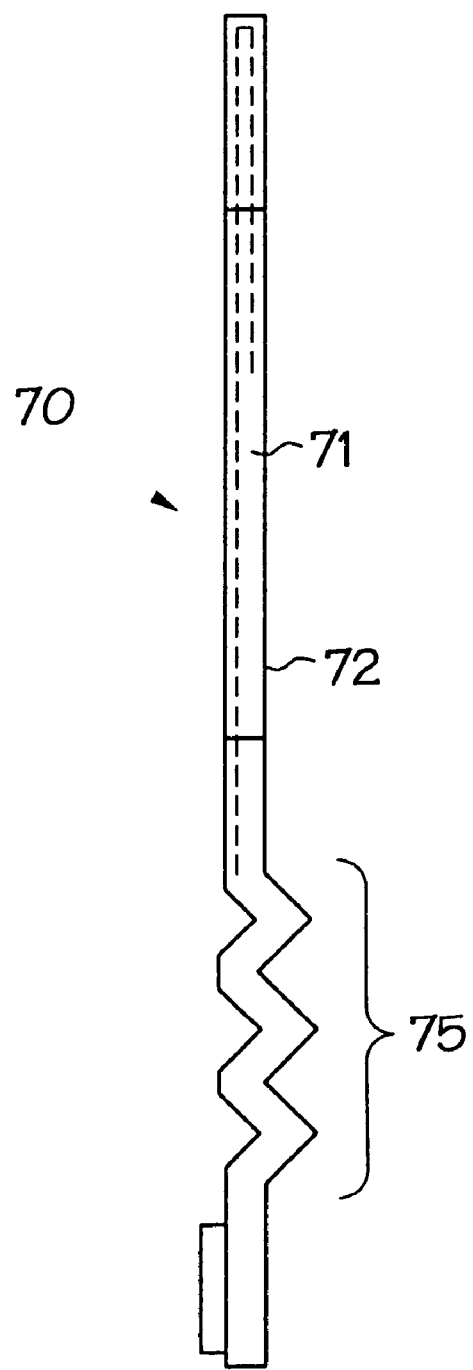
FIG. 17 is an end elevation of the wiring element of FIG. 16.

It is certified that error appears in the above-identified patent and that said Letters Patent is hereby corrected as shown below:

Drawings,
Delete Drawing Sheets 11 and 12, and substitute therefore the Drawing Sheets, consisting of Figures 15, 16 and 17, as shown on the attached pages.

UNITED STATES PATENT AND TRADEMARK OFFICE
CERTIFICATE OF CORRECTION

PATENT NO. : 6,181,299 B1
DATED : January 30, 2001
INVENTOR(S) : W. Richard Frederick et al.

It is certified that error appears in the above-identified patent and that said Letters Patent is hereby corrected as shown below:

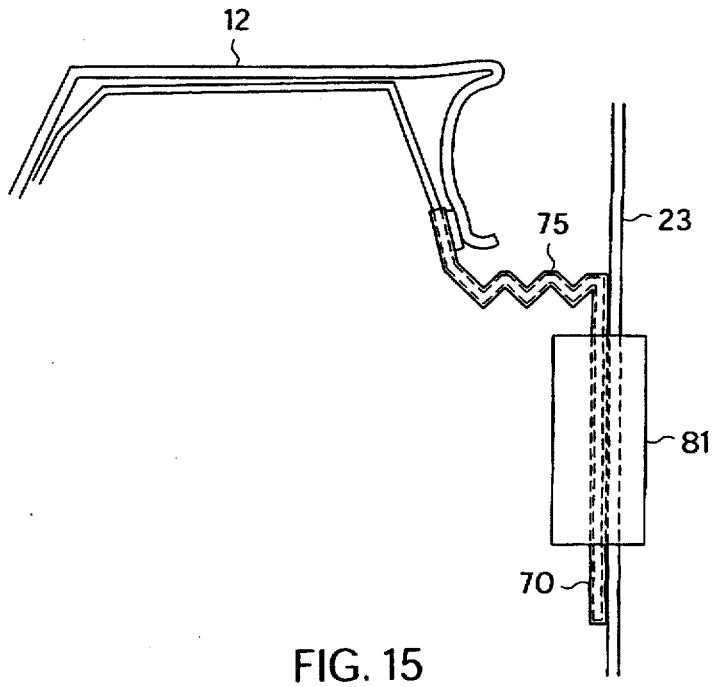

FIG. 15

UNITED STATES PATENT AND TRADEMARK OFFICE
CERTIFICATE OF CORRECTION

PATENT NO. : 6,181,299 B1
DATED : January 30, 2001
INVENTOR(S) : W. Richard Frederick et al.

It is certified that error appears in the above-identified patent and that said Letters Patent is hereby corrected as shown below:

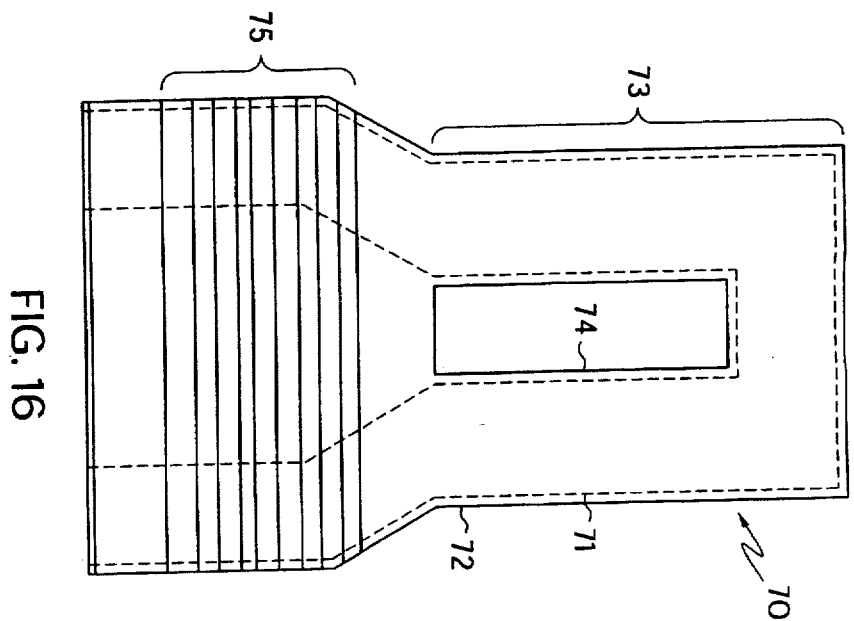

UNITED STATES PATENT AND TRADEMARK OFFICE
CERTIFICATE OF CORRECTION

PATENT NO. : 6,181,299 B1
DATED : January 30, 2001
INVENTOR(S) : W. Richard Frederick et al.

It is certified that error appears in the above-identified patent and that said Letters Patent is hereby corrected as shown below:

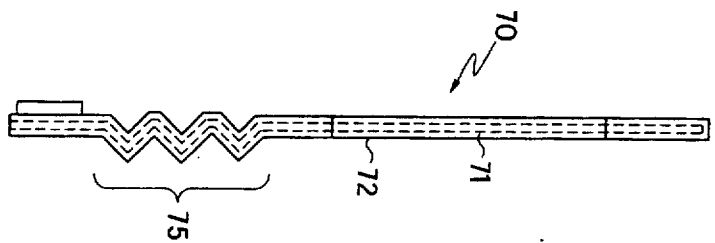

Signed and Sealed this

Fifth Day of February, 2002

Attest:

*Attesting Officer*

JAMES E. ROGAN
*Director of the United States Patent and Trademark Office*